(12) United States Patent
Michelau et al.

(10) Patent No.: US 7,455,308 B2
(45) Date of Patent: Nov. 25, 2008

(54) CONVERTIBLE RIDING TOY (75) Inventors: Frederick Michelau, Des Plaines, IL (US); Thomas Schlegel, Wheaton, IL (US); Mark Johnson, Cary, IL (US); Mark Kurth, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 79 days.

(21) Appl. No.: 11/253,007

(22) Filed: Oct. 18, 2005

(65) Prior Publication Data

US 2006/0082097 A1   Apr. 20, 2006

Related U.S. Application Data

(60) Provisional application No. 60/620,216, filed on Oct. 18, 2004.

(51) Int. Cl.
*B62K 9/02* (2006.01)

(52) U.S. Cl. .................................. 280/282; 280/1.188

(58) Field of Classification Search .............. 280/1.188, 280/7.15, 47.18, 259, 282, 272, 30, 278, 280/287

See application file for complete search history.

(56) References Cited

U.S. PATENT DOCUMENTS

| | | | | |
|---|---|---|---|---|
| 1,379,305 A | | 5/1921 | Johns | |
| 3,658,354 A | * | 4/1972 | Read | 280/7.15 |
| 4,079,957 A | * | 3/1978 | Blease | 280/278 |
| 4,389,055 A | * | 6/1983 | Cockburn | 280/274 |
| 4,422,663 A | * | 12/1983 | Hon | 280/278 |
| 4,552,372 A | * | 11/1985 | Jones | 280/87.041 |
| 4,657,270 A | * | 4/1987 | Allen et al. | 280/7.1 |
| 4,775,162 A | * | 10/1988 | Chao | 280/87.041 |
| 5,499,834 A | * | 3/1996 | Pasin et al. | 280/282 |
| 5,568,934 A | * | 10/1996 | Niemeyer | 280/282 |
| 5,927,733 A | * | 7/1999 | Banda | 280/87.041 |
| 6,082,754 A | * | 7/2000 | Jeunet et al. | 280/272 |
| 6,685,207 B1 | * | 2/2004 | Blake | 280/282 |
| 6,916,028 B2 | * | 7/2005 | Shapiro | 280/47.34 |
| 2003/0001351 A1 | * | 1/2003 | Schauble et al. | 280/87.05 |
| 2003/0140695 A1 | * | 7/2003 | Fehrenbach | 73/290 V |

OTHER PUBLICATIONS

European Search Report dated May 16, 2007.

* cited by examiner

*Primary Examiner*—Joanne Silbermann
*Assistant Examiner*—Maurice Williams
(74) *Attorney, Agent, or Firm*—DLA Piper LLP; Jennifer E. Lacroix (57) ABSTRACT

A riding toy converts between a traditional or conventional upright trike configuration and a low slung chopper configuration. A front frame tube is joined to a head tube to which the front wheel and handlebars are piviotally attached. A rear frame tube is joined to a pair of rear wheels. The front and rear frame tubes are joined by a pivot shaft so that they rotate relative to one another. As a result, the rear portion of the riding toy may be flipped over to reconfigure the riding toy between the trike and chopper configurations. An opening is formed in the front frame tube and receives spring-loaded buttons that turn with the rear frame tube so that the riding toy may be locked in the desired configuration. The front frame tube is also split and features a clamp so that it can clamp down on a guide sleeve that is attached to the rear frame tube.

14 Claims, 6 Drawing Sheets

CONVERTIBLE RIDING TOY

CLAIM OF PRIORITY

This application claims priority from U.S. Provisional Patent Application Ser. No. 60/620,216, filed Oct. 18, 2004.

BACKGROUND OF THE INVENTION

The present invention relates generally to riding toys and, more particularly, to a convertible riding toy that may be easily changed between a first configuration and a second configuration.

Riding toys, such as tricycles, bicycles, scooters, ride-ons, etc. provide children with exercise and enjoyment. As a result, they are very popular. In order to meet the desires of a single child, however, it is often necessary for a single family to separately purchase two or more riding toys. Such an approach is inefficient in terms of cost as a single child can use only one riding toy at a time. In other words, while the child is using one riding toy, the other sits idle. In addition, multiple riding toys are inefficient from a storage perspective as multiple riding toys take up more space than a single riding toy. It is therefore beneficial for a single riding toy to be capable of being configured into multiple vehicles so that the single riding toy takes the place of multiple riding toys.

The prior art includes a number of riding toys that may be reconfigured from one type of vehicle into another. For example, U.S. Pat. No. 4,691,930 to Samuel discloses a riding toy that may be configured into a number of different vehicles including a tricycle, go cart and scooter. The vehicle of the Samuel '930 patent includes a front wheel and handlebar assembly that is connected to the remaining portion of the vehicle by a removable bolt. The bolt is removed and the front wheel and handlebar assembly is separated from the remaining portion of the vehicle to place it into a new configuration.

U.S. Pat. No. 4,079,957 to Blease discloses a convertible tricycle that may be changed between an upright configuration and an underslung configuration. More specifically, the tricycle of the Blease '957 patent features handlebars that are removably attached to a steering shaft that is connected to the front forks, and thus the front wheel, of the tricycle. The steering shaft passes through an opening formed through the front portion of the tricycle body. To reconfigure the tricycle, the handlebars are removed from the steering shaft and the steering shaft is removed from the opening of the tricycle body. The body of the tricycle is then turned upside down and the steering shaft is re-inserted through the opposite side of the body opening and the handlebars reattached.

U.S. Pat. No. 4,657,270 to Allen et al. discloses a convertible tricycle that may also be changed between an upright configuration and an underslung configuration. To reconfigure the tricycle of the Allen '270 patent, the front fork and handlebar are separated from one another and removed from the tricycle head tube. The frame of the tricycle is then inverted and the front fork and handlebar re-inserted through opposite ends of the head tube. The tricycle features a seat removably attached to the frame that is also removed from the frame and installed on the opposite side to provide a seat for the new configuration.

While the vehicles of the Samuel '930, Blease '957 and Allen et al. '270 patents all provide two or more configurations for a single riding toy, each must be disassembled to be reconfigured. This is a disadvantage in terms of time and convenience. In addition, in some instances, reconfiguring the riding toys of these patents may require the use of hand tools and could result in lost parts. Furthermore, reconfiguring the vehicles may be too complicated and difficult for many children.

Accordingly, it is an object of the present invention to provide a riding toy that may be changed between configurations.

It is another object of the present invention to provide a riding toy that does not have to be disassembled to be reconfigured.

It is still another object of the present invention to provide a riding toy that is simple and easy to reconfigure.

Other objects and advantages will be apparent from the remaining portion of the specification.

SUMMARY OF THE INVENTION

The present invention is directed to a convertible riding toy that may be changed between a first configuration and a second configuration. The toy features a first frame tube having an open first frame tube end and a second frame tube having a second frame tube end. The second frame tube end is positioned adjacent to the first frame tube end. A pivot shaft is attached to and protrudes from the second frame tube end and is received by a bearing positioned within the first frame tube. The bearing receives and supports the pivot shaft in a rotatable fashion so that the first frame tube may be rotated relative to the second frame tube so that the riding toy may be changed from the first configuration to the second configuration and vice-versa.

A guide sleeve is attached to and protrudes from the second frame tube end and is received in the open end of the first frame tube end so that the first frame tube rotates relative to the guide sleeve. The first frame tube features a split and a clamp is positioned around the first frame tube proximate to the guide sleeve. When closed, the clamp causes the first frame tube to grip the guide sleeve.

The first frame tube also features an opening and a button tube is attached to the pivot shaft in a generally perpendicular and fixed fashion. The button tube has opposing first and second open ends. First and second spring buttons are positioned within the button tube and a compression spring is positioned there between. As a result, the first and second spring buttons are urged radially outwards and away from one another so that the first spring button extends out of the first open end of the button tube and engages the opening in the first frame tube when the toy is in the first configuration and the second spring button extends out of the second open end of the button tube and engages the opening in the first frame tube when the toy is in the second configuration. The clamp features a lever that surrounds the spring button positioned in the first frame tube opening when the clamp is closed.

The following detailed description of embodiments of the invention, taken in conjunction with the accompanying drawings, provide a more complete understanding of the nature and scope of the invention.

DESCRIPTION OF THE PREFERRED EMBODIMENTS

Figure 1A:
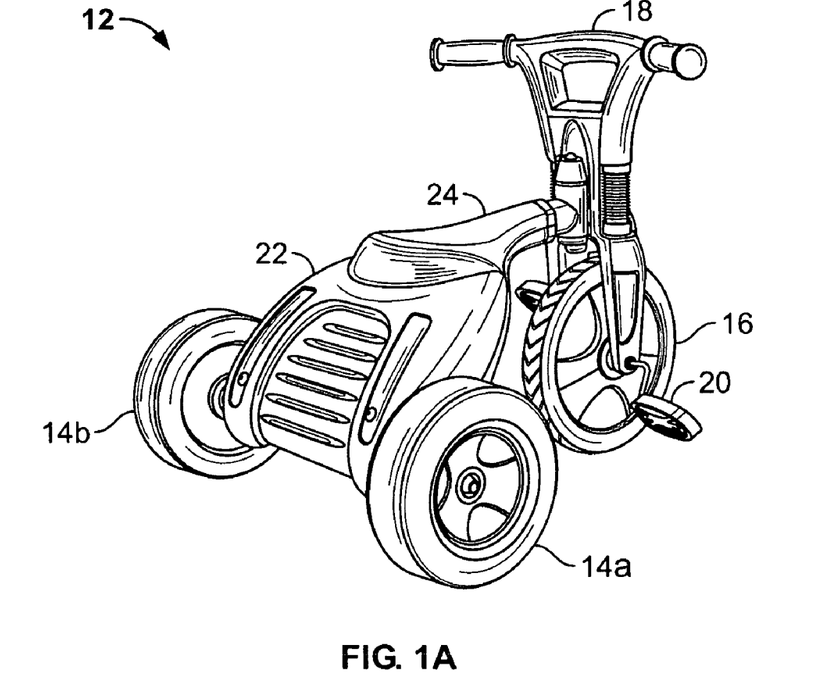
FIG. 1A is a perspective view of an embodiment of the convertible riding toy of the present invention in a trike configuration.
Figure 1B:
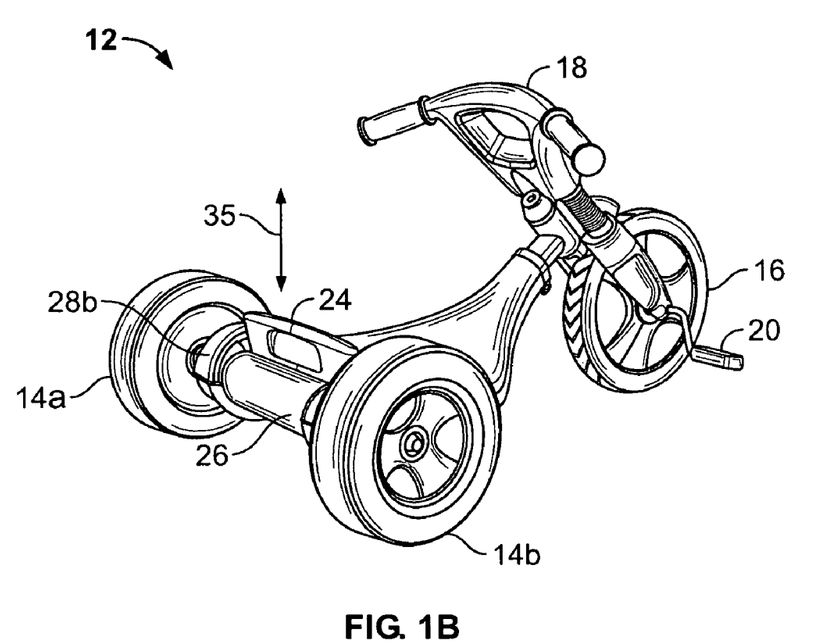
FIG. 1B is a perspective view of the convertible riding toy of FIG. 1A in a chopper configuration.

An embodiment of the convertible riding toy of the present invention is indicated in general at 12 in FIGS. 1A and 1B. While the present invention is described below in terms of a convertible tricycle, it is to be understood that it could be incorporated in an alternative type of riding toy, such as a bicycle or ride-on toy having the same or an alternative number of wheels, that changes between multiple configurations. The riding toy could also be a vehicle that is ridden by older children or adults.

As will be explained in greater detail below, the convertible tricycle 12 of FIGS. 1A and 1B converts between a traditional or conventional upright "trike" configuration (illustrated in FIG. 1A), where the rider sits near the top of the frame and therefore relatively high off of the ground and a low slung "chopper" configuration (illustrated in FIG. 1B) where the rider sits close to the ground.

As illustrated in FIGS. 1A and 1B, the tricycle 12 features a pair of rear wheels 14a and 14b and a pivoting front wheel 16 that may be steered by handlebars 18. Pedals 20 allow a rider to spin the front wheel with his or her legs so as to propel the tricycle. The tricycle also features a body, illustrated at 22, that is preferably molded from plastic so as to be light weight and durable. It should be noted that while the illustrated embodiment features a molded plastic body, the tricycle of the present invention could feature a body formed of an alternative material.

Figure 2:
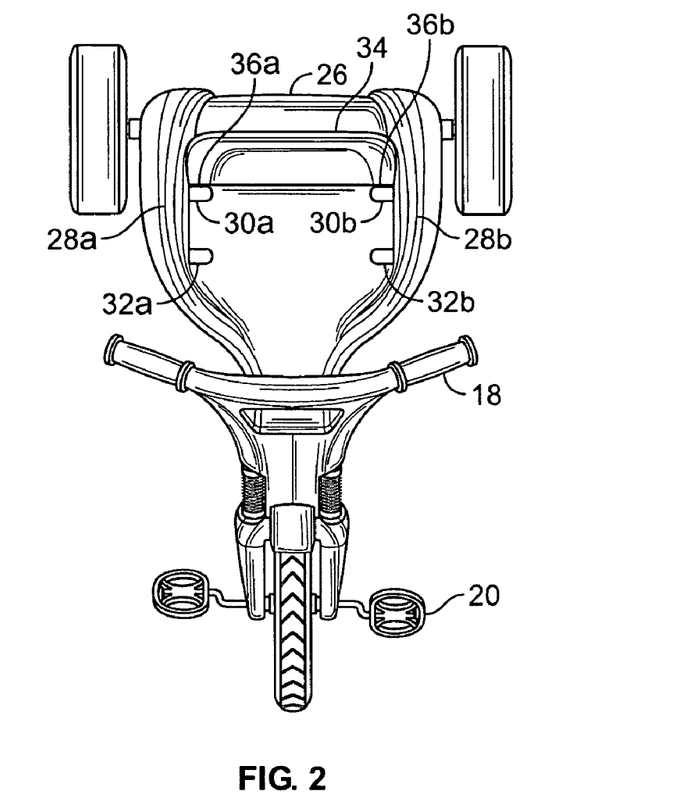
FIG. 2 is a top plan view of the convertible riding toy of FIG. 1B.
Figure 3:
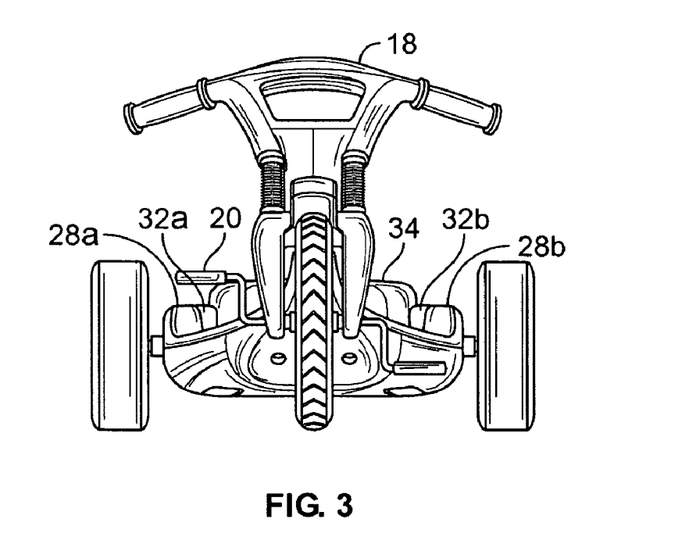
FIG. 3 is a front elevational view of the convertible riding toy of FIGS. 1B and 2.

As illustrated in FIG. 1A, one side of the body 22 features a molded seat 24 for use when in the tricycle is in the trike configuration. As illustrated in FIGS. 1B, 2 and 3 the opposite side of the body 22 features a back wall 26 and opposing side walls 28a and 28b so that a seat well is defined. A first pair of opposing protrusions 30a and 30b and a second pair of opposing protrusions 32a and 32b are molded on the inner surfaces of opposing side walls 28a and 28b so that they protrude into the seat well. A seat back 34 is positioned in the seat well in a removable fashion. More specifically, the seat back 34 is vertically inserted or removed from the seat well, as illustrated by arrows 35 in FIG. 1B. As illustrated in FIGS. 2 and 3, the seat back 34 features opposing side edges 36a and 36b that engage either protrusions 30a and 30b or 32a and 32b when the seat back 34 is inserted into the seat well so that the horizontal distance of the seat back 34 from the tricycle pedals 20 and handlebars 18 may be adjusted. As a result, the tricycle may accommodate riders of various sizes and ages.

Figure 4A:
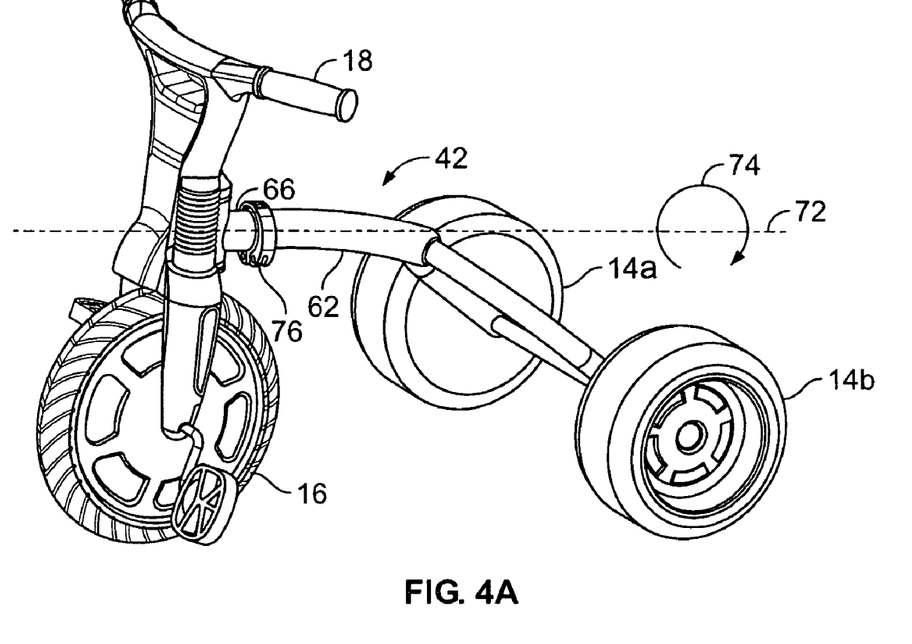
FIG. 4A is a perspective view of the convertible riding toy in the trike configuration of FIG. 1A with the plastic body removed.
Figure 4B:
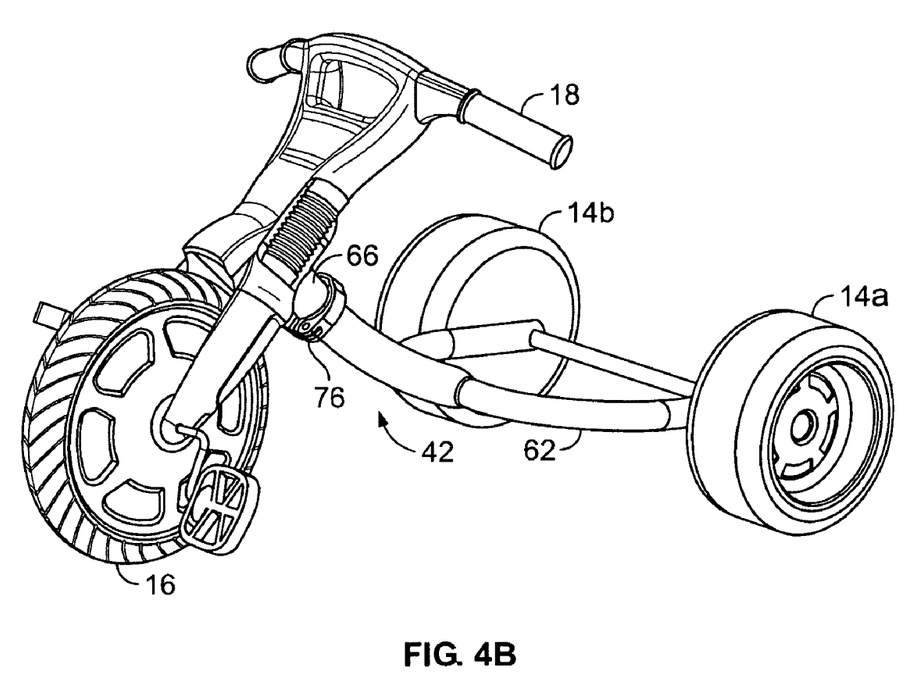
FIG. 4B is a perspective view of the convertible riding toy in the chopper configuration of FIG. 1B with the plastic body removed.

The frame of the tricycle 12 of FIGS. 1A-3 is indicated in general at 42 in FIGS. 4A and 4B. FIG. 4A illustrates the frame in the trike configuration and FIG. 4B illustrates the frame in the chopper configuration. As illustrated in FIGS. 4A and 4B, the frame features a generally Y-shaped rear portion 62 that supports the rear wheels 14a and 14b. The plastic body illustrated at 22 in FIGS. 1A-3 is mounted on and generally covers the rear frame portion 62. As illustrated in FIG. 4A, a front frame tube 66 is connected to a head tube, illustrated at 70, which pivotally supports front handlebars 18 and front wheel 16.

As illustrated in FIG. 4A, the rear frame portion 62 pivots 180° with respect to the front frame tube 66 about axis 72, as indicated by arrow 74, at pivot junction 76 to convert the tricycle from the trike configuration to the chopper configuration and vice-versa. The rear frame portion 62, front frame tube 66 and head tube 70 are preferably constructed from steel tubing, but other forms of construction and materials may alternatively be used.

Figure 5:
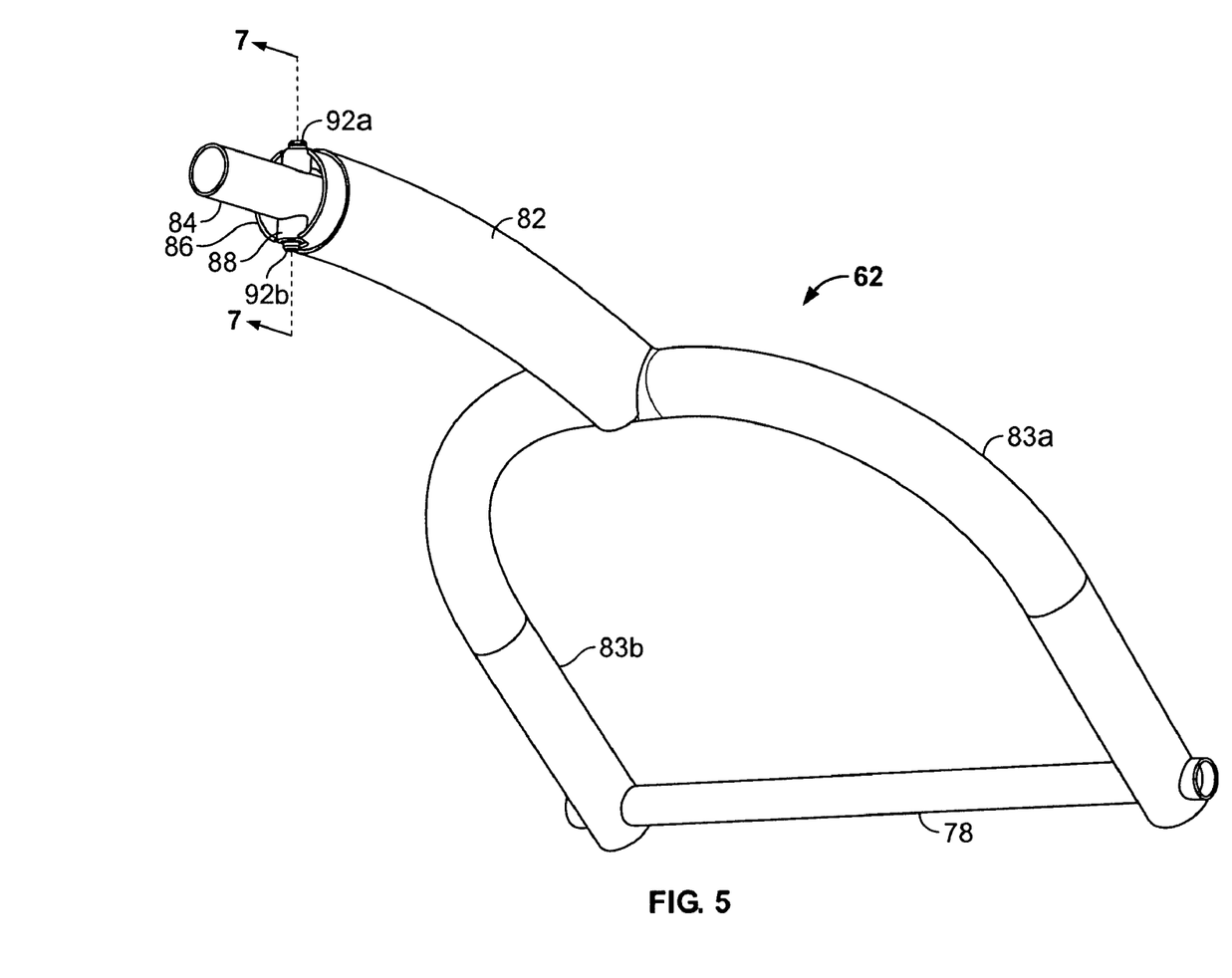
FIG. 5 is an enlarged perspective view of the rear frame portion of FIGS. 4A and 4B.

With reference to FIG. 5, an enlarged perspective view of the rear frame portion of the tricycle is indicated in general at 62. The rear wheel axle (not shown) passes through axle tube 78, which is joined to the rear frame tube 82 by rear arms 83a and 83b. As will be explained in greater detail below, a pivot shaft 84 is attached to the rear frame tube 82 in a fixed fashion, as is guide sleeve 86. Both pivot shaft 84 and guide sleeve 86 preferably are made of steel. In addition, pivot shaft 84 could be a solid rod instead of the illustrated hollow tube. A button tube 88 is attached in a perpendicular and fixed fashion to the pivot shaft 84 and receives spring pins or buttons 92a and 92b.

Figure 6:
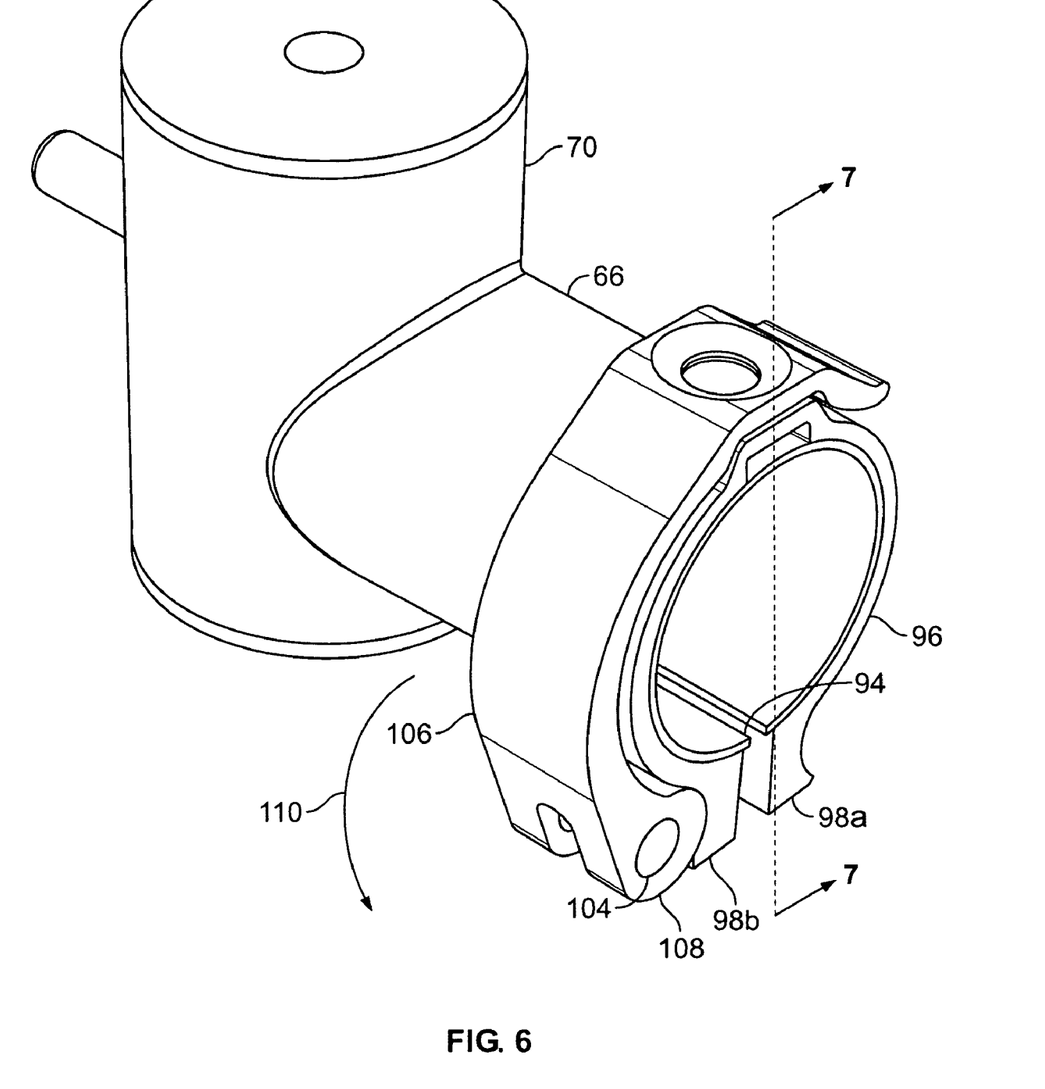
FIG. 6 is an enlarged perspective view of the head tube, front frame tube and clamp of FIGS. 4A and 4B.

FIG. 6 shows an enlarged view of the front frame tube 66 and the head tube 70. Front frame tube 66 features a split 94 along its bottom. A horseshoe or omega-shaped clamp 96 circumferentially surrounds the split front frame tube 66 and features legs 98a and 98b. A first end of a pin is attached to leg 98a in a fixed fashion via a threaded bore illustrated at 102 in FIG. 7. The pin passes through a hole formed in leg 98b that is slightly larger than, and aligned with, bore 102 so that leg 98b may move relative to the pin and leg 98a. The second end of the pin is attached to a perpendicular (to the longitudinal axis of the pin) bolt or screw passing through and engaging opening 104 formed in a lever 106.

Lever 106 of FIG. 6 pivots with respect to leg 98b of the clamp 96. The bottom of the lever features a cam surface 108. Due to the shape of cam 108, legs 98b and 98a of the clamp 96 are respectively pushed (by the cam surface) and pulled (via the pin) together when the lever 106 is positioned as indicated in FIG. 6 so that the clamp is closed. The clamping action may be released and the clamp opened by moving the lever in the direction of arrow 110.

Figure 7:
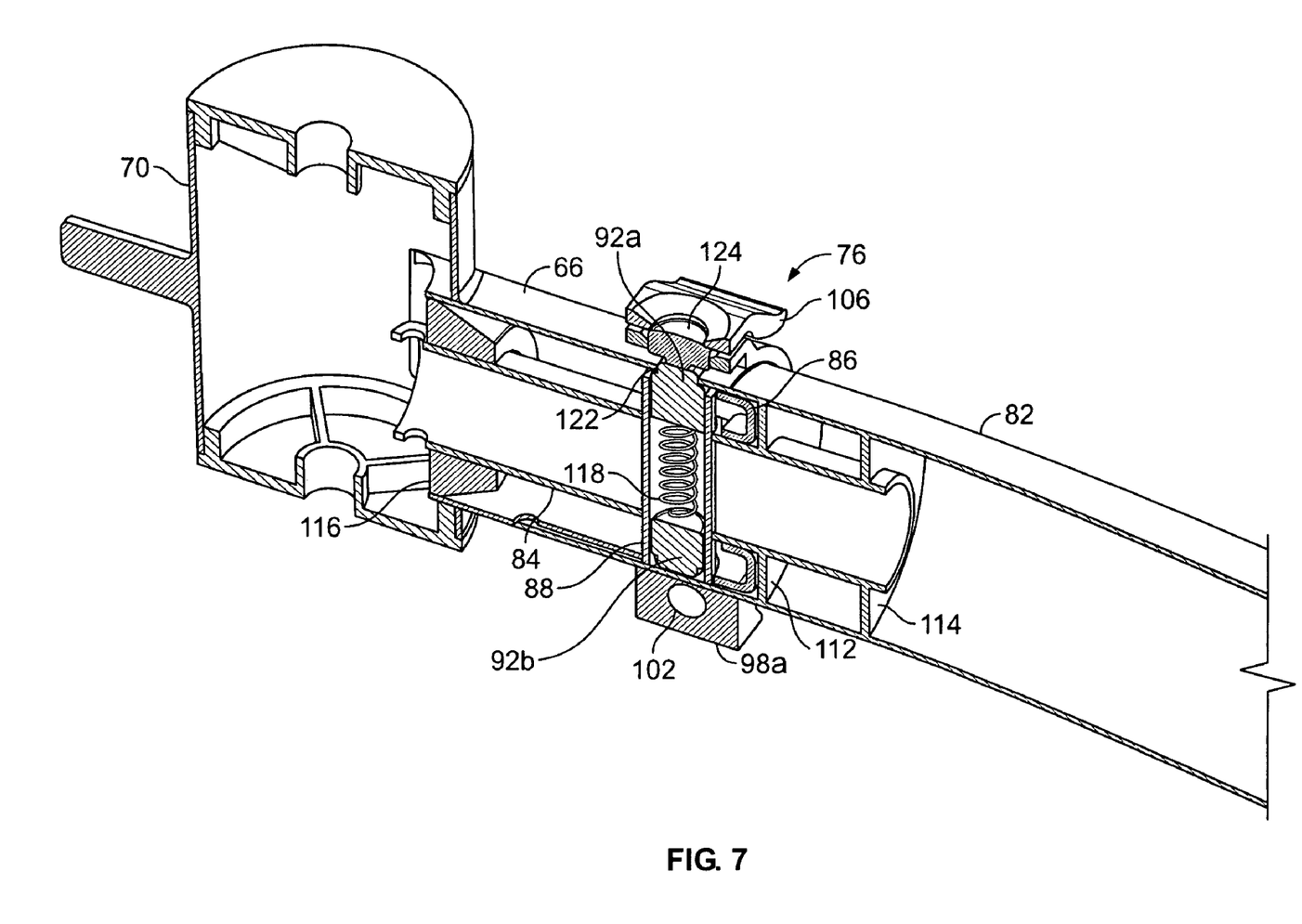
FIG. 7 is a perspective sectional view of the assembled rear frame tube of FIG. 5 and the head tube, front frame tube and clamp of FIG. 6 taken along lines 7-7 of FIGS. 5 and 6.

The assembled front frame tube 66 and rear frame tube 82 are illustrated in FIG. 7. The pivot junction 76 is indicated in general at 76 in FIG. 7. Pivot shaft 84 is secured within the rear frame tube 82 via steel flanges or webs 112 and 114 which are welded or otherwise attached to the pivot shaft 84 and the interior surface of rear frame tube 82. The pivot shaft 84 is rotatably supported within the front frame tube 66 by bearing 116, which is preferably made of plastic and secured to the inner surface of the front frame tube 66 by interference fit and/or adhesive or some other attachment means. A guide sleeve 86 is welded, or otherwise secured, into and protrudes forward from the rear frame tube 82 and is received within the open end of front frame tube 66 to keep the front and rear frame tubes aligned as they rotate relative to one another.

A button tube 88 passes through the pivot shaft 84 as illustrated in FIG. 7. The button tube is preferably constructed from steel and welded into place within the pivot shaft 84. Spring buttons 92a and 92b extend out of opposing open ends of the button tube 88 due to the action of a compression spring 118 that is positioned between the two buttons within the button tube 88. The top surface of front frame tube 66 features an opening 122 that is sized to receive each of the spring buttons individually. As a result, opening 122 receives button 92a when the tricycle is in the trike configuration and locks the tricycle into the configuration by securing frame tubes 66 and 82 into the corresponding positions. Opening 122 receives button 92b when the tricycle is in the chopper configuration.

As illustrated in FIG. 7, a release button 124 is positioned over opening 122. The top portion of lever 106 surrounds and covers the button 124 so that it may not be accidentally pressed when the clamp (96 in FIG. 6) is closed. When it is desired to change the tricycle configuration, a user moves lever 106 in the direction illustrated by arrow 110 in FIG. 6 so that clamp 96 is in the released or open position. Release button 124 may then be pressed to push either spring button 92a or 92b out of engagement with opening 122 so that the rear frame tube may be rotated relative to the front frame tube so as to place the tricycle in a new configuration.

Once the tricycle has been placed in the desired configuration, and the appropriate spring button 92a or 92b has engages the opening 122 of front frame tube 66, lever 106 is placed in the position illustrated in FIG. 6 so that clamp 96 clamps down on split front frame tube 66 so that it, due to the split 94, clamps down on the portion of the guide sleeve 86 extending into the open end of the front frame tube 66. As a result, the clamp 96 and lever 106 act as a secondary lock to lock in the selected tricycle configuration (spring buttons 92a and 92b and front frame tube opening 122 serve as the primary lock).

While the preferred embodiments of the invention have been shown and described, it will be apparent to those skilled in the art that changes and modifications may be made therein without departing from the spirit of the invention.

What is claimed is:

1. A convertible riding toy that may be changed between a first configuration and a second configuration comprising:
   a) a first frame tube having an open first frame tube end, and handlebars and a front wheel pivotally attached to the first frame tube;
   b) a second frame tube having a second frame tube end, and a pair of rear wheels attached to the second frame tube, said second frame tube end positioned adjacent said first frame tube end;
   c) a pivot shaft attached to and protruding from the second frame tube end;
   d) said first frame tube receiving and engaging said pivot shaft in a rotatable fashion so that said first frame tube may be rotated relative to the second frame tube so that the riding toy may be changed from the first configuration to the second configuration and vice-versa;
   e) a button tube attached to said pivot shaft in a generally perpendicular and fixed fashion and having opposing first and second open ends,
   f) first and second spring buttons positioned within the button tube; and
   g) a compression spring positioned within the button tube between the first and second spring buttons so as to urge the first and second spring buttons radially outwards and away from one another so that the first spring button extends out of the first open end of the button tube and engages an opening in the first frame tube when the toy is in a first configuration and the second spring button extends out of the second open end of the button tube and engages the opening in the first frame tube when the toy is in a second configuration.

2. The convertible riding toy of claim 1 further comprising a guide sleeve attached to and protruding from the second frame tube end, said guide sleeve received in the open end of the first frame tube end so that said first frame tube rotates relative to the guide sleeve.

3. The convertible riding toy of claim 2 wherein said first frame tube features a split and further comprising a clamp positioned around the first frame tube proximate to the guide sleeve, said clamp causing said first frame tube to grip said guide sleeve when said clamp is closed.

4. The convertible riding toy of claim 3 wherein the clamp features a lever that surrounds a spring button positioned in the first frame tube opening when the clamp is closed.

5. The convertible riding toy of claim 1 further comprising a bearing positioned within the first frame tube, said bearing supporting the pivot shaft within the first frame tube.

6. The convertible riding toy of claim 1 wherein the first configuration is a trike configuration and the second configuration is a chopper configuration.

7. A convertible riding toy that may be changed between a first configuration and a second configuration comprising:
   a) a front frame tube having a front frame tube end;
   b) a rear frame tube having a rear frame tube end;
   c) means for connecting the front frame tube end to the rear frame tube end so that said front frame tube may be rotated relative to the rear frame tube so that the riding toy may be changed from the first configuration to the second configuration and vice-versa;
   d) means for locking the convertible riding toy in a selected one of the first and second configurations;
   e) a button tube attached to said pivot shaft in a generally perpendicular and fixed fashion and having opposing first and second open ends,
   f) first and second spring buttons positioned within the button tube; and
   g) a compression spring positioned within the button tube between the first and second spring buttons so as to urge the first and second spring buttons radially outwards and away from one another so that the, first spring button extends out of the first open end of the button tube and engages an opening in the front frame tube when the toy is in a first configuration and the second spring button extends out of the second open end of the button tube and engages the opening in the front frame tube when the toy is in a second configuration.

8. The convertible riding toy of claim 7 wherein the means for connecting includes a pivot shaft attached to and protruding from the rear frame tube end, said pivot shaft received in the open end of the front frame tube end and engaged by the front frame tube so that said front frame tube rotates relative to the pivot shaft.

9. The convertible riding toy of claim 8 wherein the means for connecting further includes a guide sleeve attached to and protruding from the rear frame tube end, said guide sleeve received in the open end of the front frame tube end so that said front frame tube rotates relative to the guide sleeve and wherein said front frame tube features a split and the means for locking includes a clamp positioned around the front frame tube proximate to the guide sleeve, said clamp causing said front frame tube to grip said guide sleeve when said clamp is closed.

10. The convertible riding toy of claim 7 further comprising a guide sleeve attached to and protruding from the rear frame tube end, said guide sleeve received in the open end of the front frame tube end so that said front frame tube rotates relative to the guide sleeve.

11. The convertible riding toy of claim 10 wherein said front frame tube features a split and further comprising a clamp positioned around the front frame tube proximate to the guide sleeve, said clamp causing said front frame tube to grip said guide sleeve when said clamp is closed.

12. The convertible riding toy of claim 11 wherein the clamp features a lever that surrounds a spring button positioned in the front frame tube opening when the clamp is closed.

13. The convertible riding toy of claim 7 wherein the riding toy is a tricycle and further comprising handlebars and a front wheel pivotally attached to the front frame tube and a pair of rear wheels attached to the rear frame tube.

14. The convertible riding toy of claim 13 wherein the first configuration is a trike configuration and the second configuration is a chopper configuration.

* * * * *